Dec. 1, 1936.  A. RAFFA  2,062,931
RETRACTABLE AUXILIARY WHEEL
Filed March 27, 1935  2 Sheets-Sheet 1
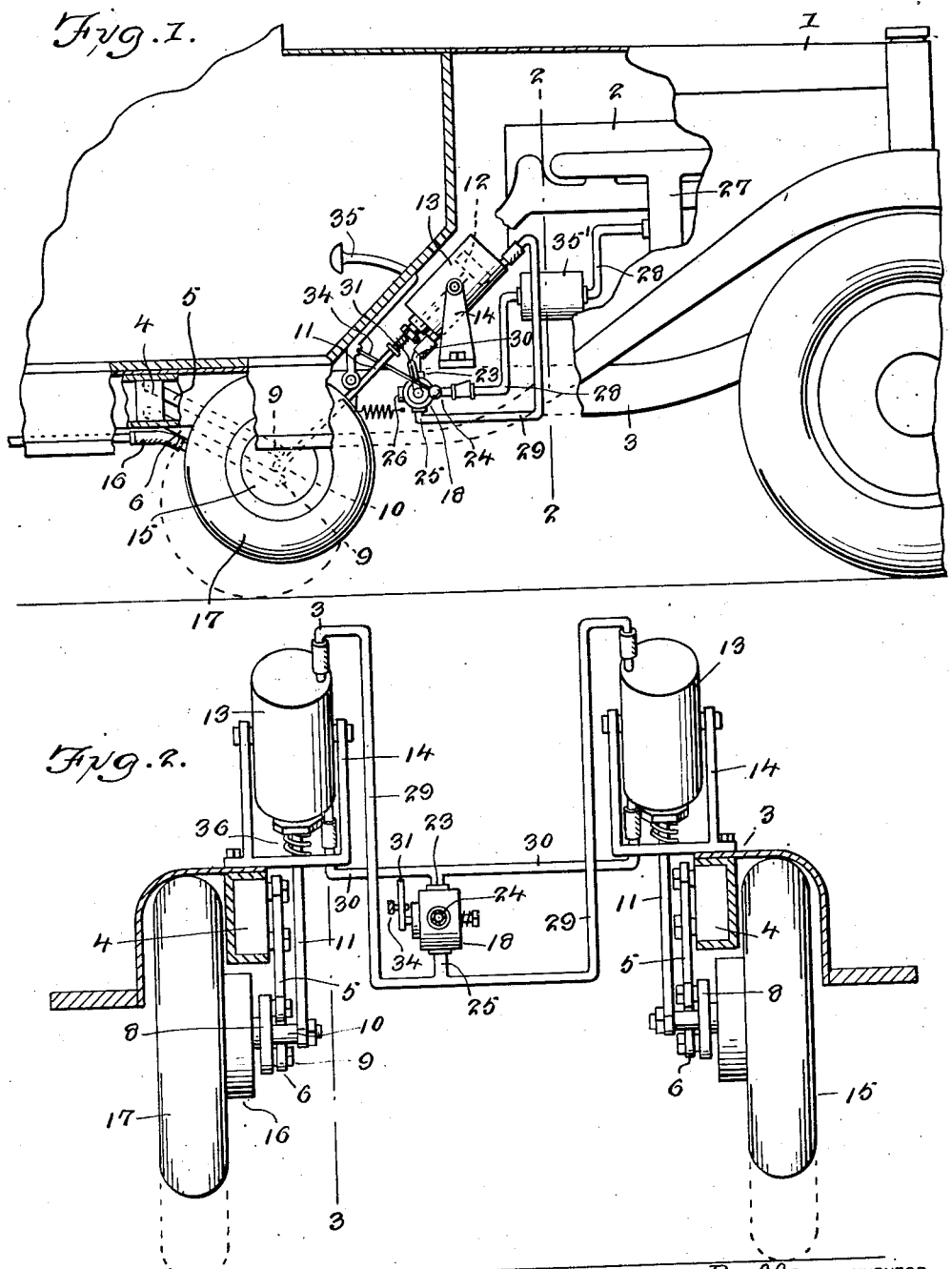

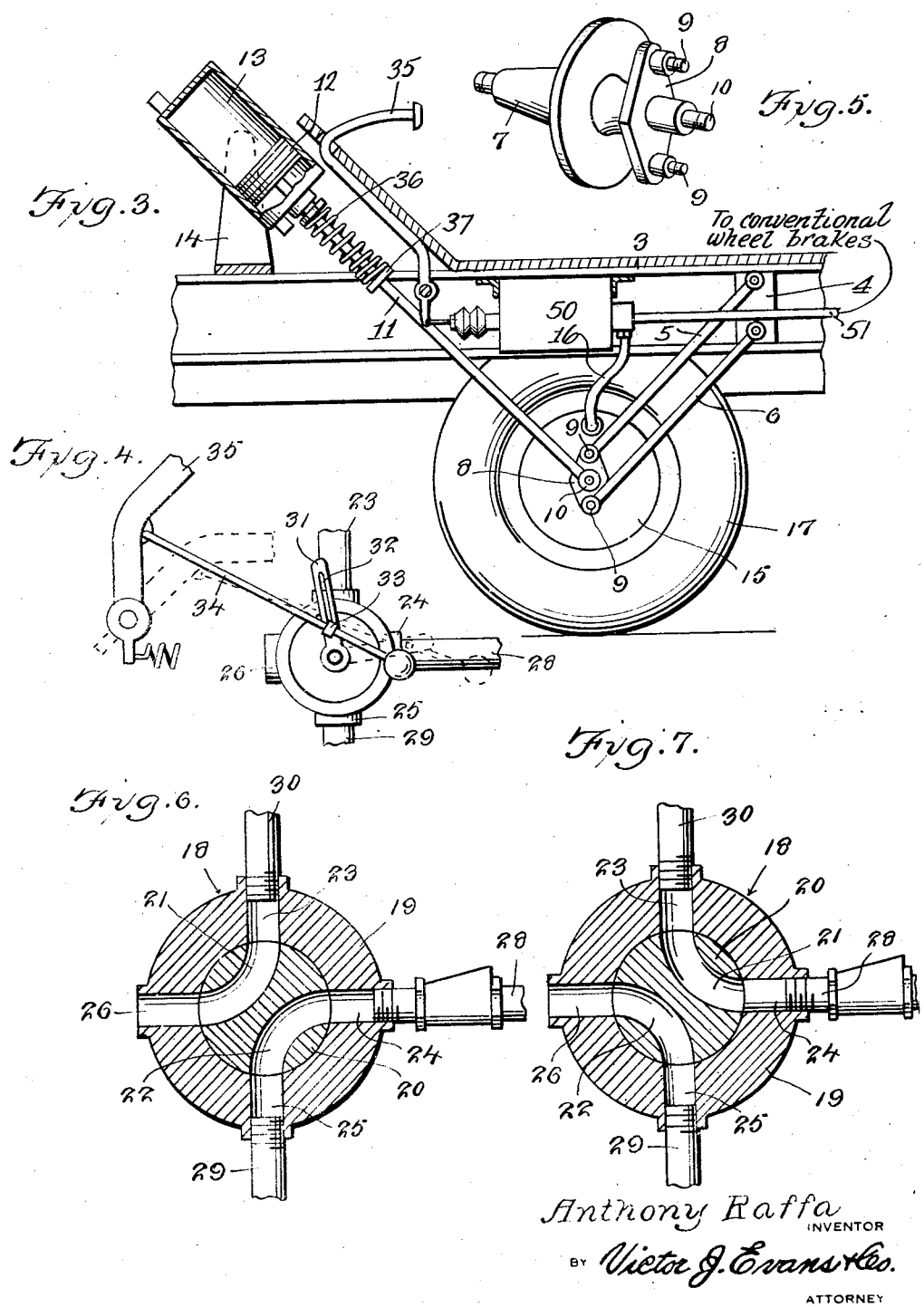

Patented Dec. 1, 1936

2,062,931

UNITED STATES PATENT OFFICE 2,062,931

RETRACTABLE AUXILIARY WHEEL

Anthony Raffa, Elmora, Pa.

Application March 27, 1935, Serial No. 13,351

3 Claims. (Cl. 188—5)

This invention relates to auxiliary braking wheels for motor vehicles and has for the primary object the provision of a device of this character which will materially increase the braking action to a vehicle when desiring to stop or retard the speed of travel of said vehicle and which becomes inoperative when not stopping or retarding the vehicle so as not to interfere or retard the speed of travel under normal traveling conditions, and which will add to the stability of the vehicle during the stopping or retarding thereof, consequently materially reducing the chances of skidding of the vehicle.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary vertical sectional view showing a motor vehicle equipped with auxiliary braking wheels which are constructed in accordance with my invention.

Figure 2 is a sectional view taken on the line 2—2 of Figure 1.

Figure 3 is a sectional view taken on the line 3—3 of Figure 2, showing the connection of the foot brake pedal with the piston in the master fluid cylinder from which the braking fluid is directed to both the conventional wheel brakes and the auxiliary brake wheels of the improvement.

Figure 4 is a detail view illustrating the operating connections between the brake pedal and the control valve of my invention.

Figure 5 is a perspective view illustrating one of the axles of my invention.

Figure 6 is a detail sectional view showing the control valve.

Figure 7 is a similar view showing a different position of the control valve from that shown in Figure 6.

Referring in detail to the drawings, the numeral 1 indicates a fragmentary portion of a motor vehicle wherein the engine thereof is indicated by the character 2. The frame 3 of the vehicle has secured to opposite sides thereof brackets 4 each having pivoted thereto arms 5 and 6. Comparatively short axles 7 are integral with the plates 8 and integral with the plates are end pivots 9 and intermediate pivots 10 arranged in alignment with the axles 7. The pivots 9 connect the arms 5 and 6 to the axles while the pivots 10 connect to said axles piston stems 11 of pistons 12 which operate in cylinders 13. Brackets 14 are secured to the frame 3 and pivotally support the cylinders. Journaled upon the axles 7 are wheels 15 equipped with brake means 16 forming part of the brake mechanism of the motor vehicle 1. The wheels 15 have cushion tires 17 provided with comparatively broad suction surfaces. As shown by Figure 3, the frame 3 has fixed on the under face thereof a master fluid cylinder 50 that has a slidable piston therein which is movable by the foot brake lever of the automobile for directing fluid to the brakes in the auxiliary wheels through tubes 16 and for likewise directing fluid through pipes 51 to the conventional wheel brakes. The manner in which the brake pedal operates the valve of the improvement will presently be set forth.

A control valve 18, consisting of a housing 19 and a valve element 20, is mounted for oscillation therein and which is provided with curved passages 21 and 22. The housing 19 is provided with ports 23, 24, 25 and 26. The port 26 is in communication with the atmosphere and the port 24 is connected to the intake manifold 27 of the engine 2 by a pipe 28. The upper ends of the cylinders 12 are connected to the ports 25 by pipes 29 and the lower ends of the cylinders are connected to the ports 23 of the valve 18 by pipes 30. The valve element can be positioned to connect the pipe 28 to either of the pipes 29 or 30 by the arrangement of the passages 21 and 22. It will be seen that when the pipe 28 is connected to the pipe 29, the pipe 30 is open to the atmosphere and vice versa when the pipe 28 is connected to the pipe 30.

An arm 31 is secured to the valve element 20 and is provided with a slot 32 in which slides a coupling head 33 slidably mounted on a connecting rod 34 and the latter is pivotally connected to the brake pedal 35 of the brake mechanism of the motor vehicle.

The brake pedal when in non-brake applying position positions the arm 31 so that the valve element 20 is placed to connect the pipe 28 with the pipes 29, placing the upper end of the cylinders under a partial vacuum which acts to hold the braking wheels 15 in an elevated position, as shown in Figure 1. The movement of the brake pedal towards brake applying position positions the valve element 20 so that the pipes 30 are in communication with the pipe 28, placing in the lower ends of the cylinders a partial vacuum acting to draw the pistons 12 downwardly moving the braking wheels 15 into engagement with the ground. As the brake pedal moves towards brake applying position it brings in operation the brake applying mechanism of the motor vehicle which besides acting upon the ordinary wheels of the motor vehicle it also acts upon the braking wheels 15 so that when the latter engage with the ground will aid in retarding the speed of travel of the motor vehicle, consequently permitting the motor vehicle to be more rapidly stopped. The wheels 15 when in engagement with the ground also add stability to the vehicle cooperating with the ordinary wheels of the vehicle in reducing skidding of the vehicle to a minimum.

A vacuum tank 35' is interposed in the pipe 28 and by reference to Figure 1 it will be seen that the cylinders 13 are supported by the brackets 14 in an inclined plane. The stems 11 of the pistons have coiled springs 36 mounted thereon which bear against the ends of the cylinders and collars 37 secured to the stems.

Having described the invention, I claim:

1. In combination with a motor vehicle having an engine provided with an intake manifold and a brake mechanism, axle supporting structures pivoted to the motor vehicle, axles carried by said structures, auxiliary braking wheels journaled on said axles and having the brakes thereof connected to the brake mechanism, and vacuum means connected to said axles and to the intake manifold and controlled by the brake mechanism for moving the braking wheels into and out of engagement with the ground.

2. In combination with a motor vehicle having an engine provided with an intake manifold and a brake mechanism, axle supporting structures pivoted to the motor vehicle, axles carried by said structures, auxiliary braking wheels journaled on said axles and having the brakes thereof connected to the brake mechanism, pistons connected to said axles, pivotally supported cylinders carried by the vehicle and receiving said pistons, means connecting said cylinders to the intake manifold of the engine, and control means incorporated in said last means and connected to the brake mechanism.

3. In combination with a motor vehicle having an engine provided with an intake manifold and a brake mechanism, axle supporting structures pivoted to the motor vehicle, axles carried by said structures, auxiliary braking wheels journaled on said axles and having the brakes thereof connected to the brake mechanism, pistons connected to said axles, pivotally supported cylinders carried by the vehicle and receiving said pistons, a control valve connected to opposite ends of the cylinders and to the intake manifold of the engine, and means connecting the control valve to the brake mechanism.

ANTHONY RAFFA.